United States Patent
Gruener-Nielsen et al.

(10) Patent No.: US 7,486,858 B2
(45) Date of Patent: Feb. 3, 2009

(54) SYSTEMS AND METHODS FOR CREATING LOCALIZED REFRACTIVE INDEX MODULATIONS IN AN OPTICAL FIBER

(75) Inventors: Lars Gruener-Nielsen, Copenhagen (DK); Torben Erik Veng, Roskilde (DK)

(73) Assignee: Furukawa Electric North America, Inc., Norcross, GA (US)

( * ) Notice: Subject to any disclaimer, the term of this patent is extended or adjusted under 35 U.S.C. 154(b) by 0 days.

(21) Appl. No.: 11/803,744

(22) Filed: May 16, 2007

(65) Prior Publication Data

US 2008/0285907 A1 Nov. 20, 2008

(51) Int. Cl.
G02B 6/34 (2006.01)

(52) U.S. Cl. .......................... 385/37; 385/123

(58) Field of Classification Search ........................ None
See application file for complete search history.

(56) References Cited

U.S. PATENT DOCUMENTS

| | | | | |
|---|---|---|---|---|
| 4,946,250 | A | * | 8/1990 | Gonthier et al. ............... 385/27 |
| 5,708,740 | A | * | 1/1998 | Cullen ........................ 385/39 |
| 6,130,974 | A | * | 10/2000 | Rivoallan ..................... 385/37 |
| 6,411,746 | B1 | * | 6/2002 | Chamberlain et al. ........... 385/2 |
| 6,832,025 | B2 | * | 12/2004 | Fisher et al. .................. 385/37 |
| 2003/0002795 | A1 | * | 1/2003 | Fisher et al. .................. 385/37 |
| 2003/0103708 | A1 | * | 6/2003 | Galstian et al. ................ 385/1 |
| 2003/0180001 | A1 | * | 9/2003 | Gonthier ....................... 385/43 |
| 2004/0000167 | A1 | | 1/2004 | Dempsey et al. |
| 2004/0086227 | A1 | * | 5/2004 | Bae et al. ...................... 385/37 |
| 2004/0091219 | A1 | | 5/2004 | Christensen et al. |

FOREIGN PATENT DOCUMENTS

| | | |
|---|---|---|
| EP | 0 582 894 A1 | 2/1994 |
| EP | 0895103 A1 | 2/1999 |
| GB | 1556505 | 11/1979 |
| GB | 2210470 A | 6/1989 |
| GB | 2 347 759 A | 9/2000 |
| JP | 2005164090 A | 6/2005 |

OTHER PUBLICATIONS

European Patent Office, European Search Report, European Patent Application No. EP 08 00 7361.
Eggleton, et al., "Novel Waveguide Structures for Enhanced Fiber Grating Devices," IEEE Journal on Selected Topics in Quantum Electronics, vol. 7, No. 3, pp. 409-424 (May/Jun. 2001).

* cited by examiner

*Primary Examiner*—Sung H Pak
(74) *Attorney, Agent, or Firm*—Jacobs & Kim LLP; Daniel Kim, Esq.

(57) ABSTRACT

A technique is described for creating a localized modulation of an optical fiber's refractive index profile. A segment of optical fiber is loaded into a heating unit having a resistive heating element with a localized heating zone. A selected portion of the fiber segment is positioned within the heating zone, and the heating unit is used to create a refractive index modulation the selected fiber portion. The localized modulation is repeated along the length of the fiber segment to write a fiber grating. Also described is a resistive heating system for performing the described technique.

19 Claims, 10 Drawing Sheets

SYSTEMS AND METHODS FOR CREATING LOCALIZED REFRACTIVE INDEX MODULATIONS IN AN OPTICAL FIBER

BACKGROUND OF THE INVENTION

1. Field of the Invention

The present invention relates generally to optical fiber devices and methods, and in particular to improved systems and methods for creating localized refractive index modulations in an optical fiber.

2. Description of Prior Art

Certain optical devices, such as long-period gratings (LPGs), are fabricated by creating a series of modulations in the refractive index profile of a segment of an optical waveguide. LPGs have been made using a number of different techniques, including the following: exposure to ultraviolet (UV) light; $CO_2$ laser heating; femtosecond laser heating; and electrical arcing in a fusion splicer. FIG. 1 shows a diagram of a system 20 in which a $CO_2$ laser 22 is used to "write" a grating structure into an optical fiber 24. The fiber is loaded into a translator assembly 26 that moves the fiber 24 in the $CO_2$ laser beam 28 with some modulation.

Currently used techniques typically require costly equipment, in addition to the fiber translator assemblies. These techniques also suffer from a number of other drawbacks. For example, the use of UV light techniques may result in hydrogen loading. $CO_2$ lasers and fusion splicers typically deliver non-uniform heat to a fiber, resulting in a modulation that is not rotationally symmetric, thereby potentially introducing an undesirable polarization dependence into the fabricated device. Also, there are safety issues when using lasers.

SUMMARY OF THE INVENTION

These and other issues of the prior art are addressed by the present invention, one aspect of which provides a method for creating a localized refractive index modulation in an optical fiber. A segment of optical fiber is loaded into a heat treatment station including an electrical resistive heating unit having a localized heating zone. A selected portion of the fiber segment is positioned with the heating zone, and the electrical resistive heating unit is used to create a local refractive index change in the optical fiber within the localized heating zone. The localized modulation is repeated along the length of the fiber segment to write a fiber grating. A further aspect of the invention provides a resistive heating system for performing the described technique.

Additional features and advantages of the present invention will become apparent by reference to the following detailed description and accompanying drawings.

DETAILED DESCRIPTION

Aspects of the present invention provide systems and techniques for creating localized modulations in an optical fiber refractive index profile. These systems and techniques are described herein with respect to the fabrication of long-period gratings (LPGs). However, it will be appreciated that the systems and techniques described herein may be applied to fabricate other types of optical devices.

An LPG is typically comprises a segment of optical fiber having a periodic modulation of its refractive index profile along its length. The modulation allows light in a first propagating mode to be coupled to other modes. The modulation period typically is in the range of 100 to 1000 μm. This type of coupling has many applications. One example is as a filter, such as for gain flattening, where a guided mode is coupled into a leaky mode. Another example is as a mode converter, where one guided mode is coupled into another guided mode having more desirable propagation characteristics, e.g., with respect to chromatic dispersion.

The functioning of an LPG may be expressed mathematically. For example, consider the case of a fiber guiding only one mode, referred to herein as the "fundamental mode," and other, higher-order, leaky modes, referred to as the "cladding modes." In that case, the coupling of launched power $P_{01}(0)$ from the fundamental to the n-th cladding mode can be expressed as follows:

$$\frac{P_{cl}^n(L)}{P_{01}(0)} = \frac{\sin^2\left[\kappa_g * L * \sqrt{1+(\delta/\kappa_g)^2}\right]}{1+(\delta/\kappa_g)^2} \quad (1)$$

where L is the grating length, $P_{cl}^n(L)$ is the power in the cladding more, and $\kappa_g$ is the grating coupling constant. The detuning parameter $\delta$ characterizes the mismatch between the propagation constants $\beta_{01}$ and $\beta_{cl}^n$ of the two modes in question:

$$\delta = 0.5 * \{\beta_{01} - \beta_{cl}^n - 2*\pi/\Lambda\} \quad (2)$$

where $\Lambda$ is the grating period.

A number of different mechanisms have been recognized for modulating an optical fiber's refractive index profile, including the following: physical tapering, micro deformations, and relaxation of a fiber's drawn-induced stresses.

According to an aspect of the present invention, an electrical resistive heater is used to write an LPG, or like device, into a segment of optical fiber. An electrical resistive heater is far cheaper and safer than the other techniques described above. Also, the described techniques allow an LPG to be fabricated with optimal grating strength.

Figure 2:
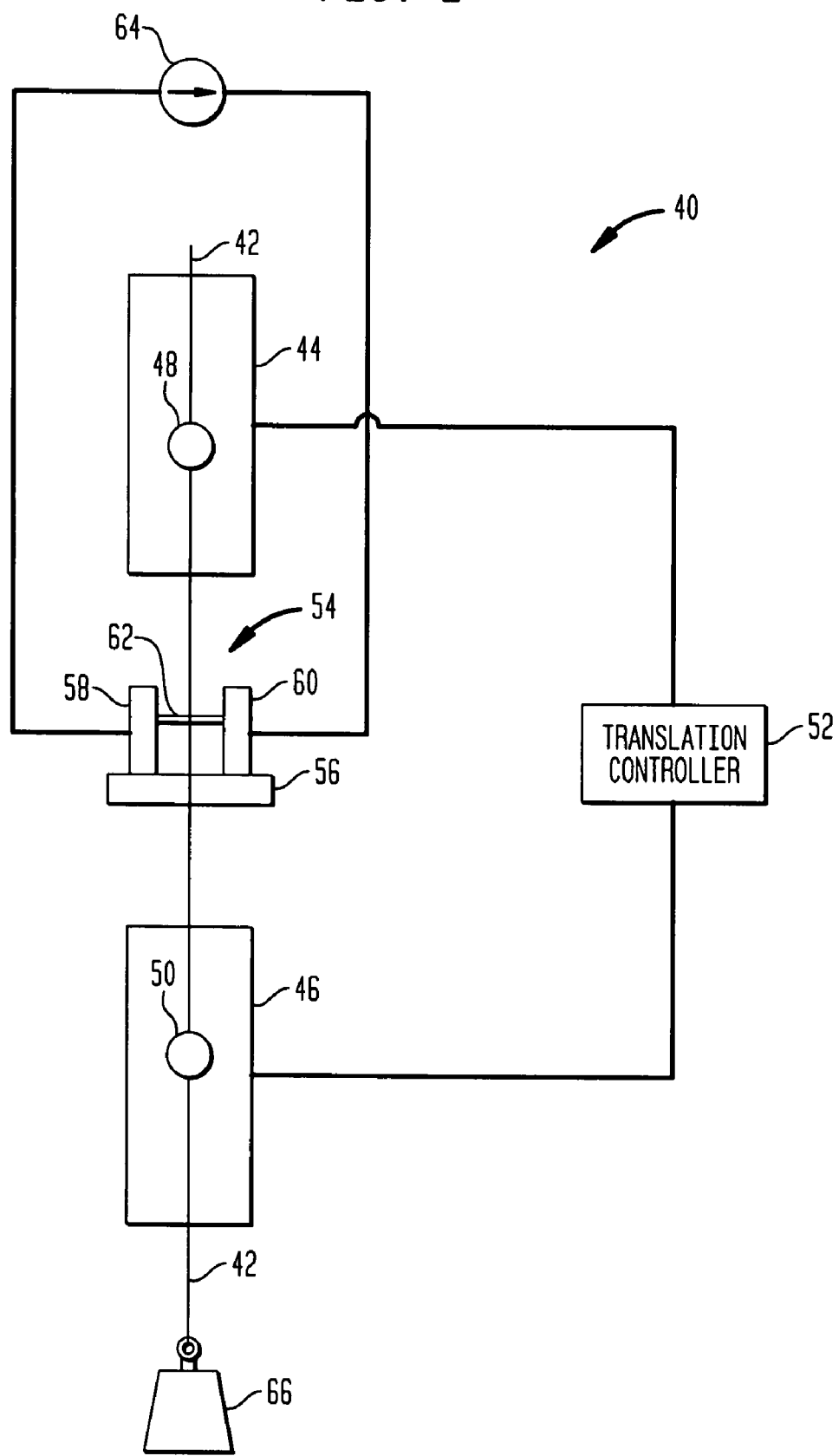
FIG. 2 shows a diagram of a system, according an aspect of the invention, for using a resistive heater to write a long-period grating, or the like, into an optical fiber segment.

FIG. 2 shows a diagram of a general system 40 according to the present invention. An optical fiber 42 is loaded into a precision fiber translation assembly including a first translator 44 and a second translator 46. Each of the translators 44 and 46 has a respective clamp 48 and 50 or other suitable device for holding the fiber 42 in place. The two translators 44 and 46 move in unison, and are controlled by a suitable controller 52 that allows the fiber 42 to be moved precisely along its longitudinal axis. The controller 52 can be programmed to control the distance and speed of the translational movement, and can also be programmed to introduce precisely timed pauses, in which the fiber remains stationary for a predetermined amount of time.

System 40 further includes a resistive heating assembly 54 that includes a chassis 56 to which there are mounted a pair of electrode blocks 58 and 60. A resistive heating element 62 is mounted between electrode blocks 58 and 60. The resistive heating element 62 includes a hole through which the fiber 42 is threaded. A suitable current source 64 is connected to electrode blocks 58 and 60 and causes a controlled amount of current to flow through the resistive heating element 54. As discussed below, the resistive heating element 54 creates a highly localized heating zone for producing a precise, localized modulation of the fiber's refractive index profile.

As discussed below, a predetermined amount of added tension may be applied to the optical fiber 42. This added tension is represented by weight 66, but other suitable components or subassemblies may be used to apply tension to the fiber 42. As further discussed below, according to another aspect of the invention, no added tension is applied to the optical fiber 42, in which case weight 66, or other tensioning component, would be omitted.

According to a further aspect of the invention, the resistive heating element 62 is implemented using a plate fabricated from Kanthal, or other suitable material, such as tungsten, graphite, iridium, and the like. Kanthal is an alloy of iron, chromium, aluminum, and cobalt that is known for its ability to withstand high temperatures, and having great electrical resistance. As such, it is frequently used in heating elements, especially where the application demands temperatures above the melting point of Nichrome or other such materials. Alternatively, the resistive heating element 62 may be implemented using a wire fabricated from platinum, or other like material.

Figure 3:
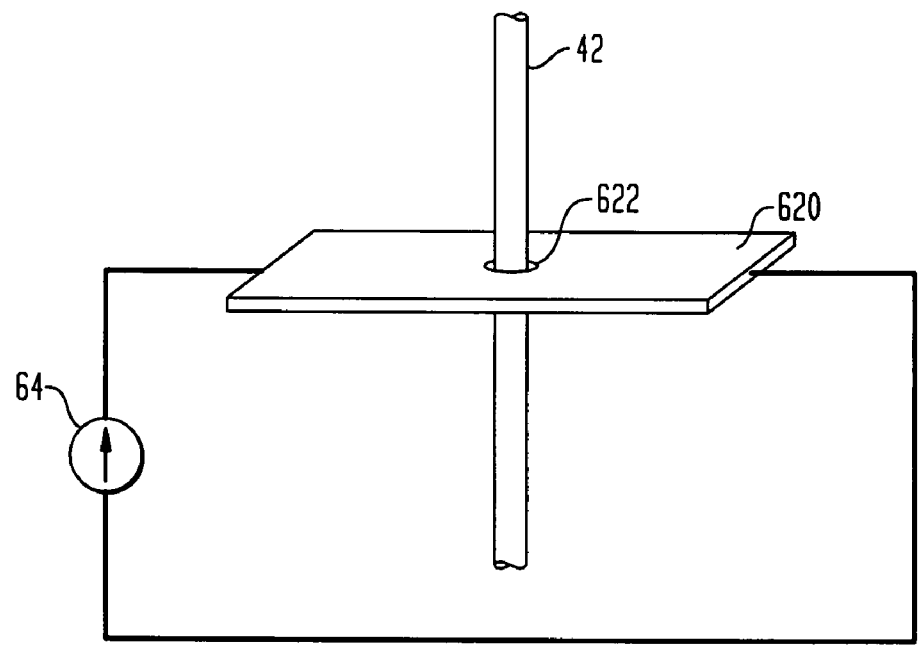
FIG. 3 shows a diagram of a resistive heater in which the heating element is implemented using a plate formed from Kanthal, or like material.
Figure 4:
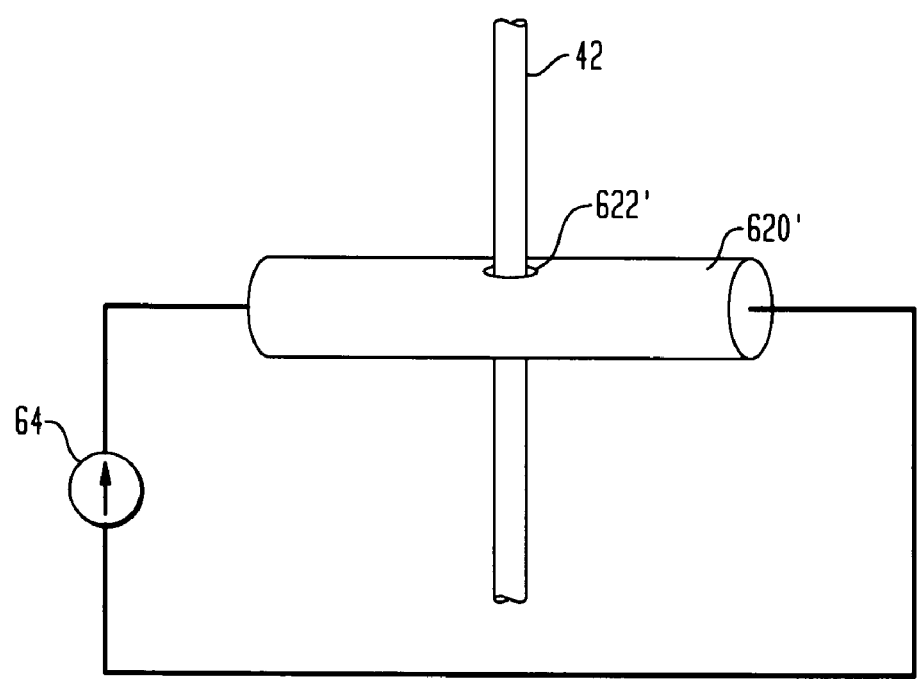
FIG. 4 shows a diagram of a resistive heater, in which the heating element is implemented using a wire formed from platinum, or like material.

FIG. 3 shows an isometric view of a heating element 620 fabricated from a plate of Kanthal, or like material. FIG. 4 shows an isometric view of a heating element 620' fabricated from a wire made out of platinum, or like material. In FIG. 3, a precisely dimensioned hole 622 is formed in the plate 620. In FIG. 4, a precisely dimensioned hole 622' is formed in the wire 620. Holes 622 and 622' may be formed using a laser or other suitable device. The size of the holes 622 and 622' is designed to closely receive the optical fiber 42, and is dimensioned such that when the heating elements 620 and 620' are heated to their respective operating temperatures, a localized heating zone is formed that is shaped to create a desired localized change in the refractive index profile of the fiber 42. Reducing the diameter of the fiber 42 allows the geometry of the heating element 620, 620' to be minimized, thereby creating a more localized heating region.

The heating element geometries illustrated in FIGS. 3 and 4 may be used to create heating zones that are sufficiently localized to modulate the refractive index profile of the treated fiber 42 at the small periods required to form a fiber grating. As mentioned above, typical periods range from 100 to 1000 μm.

Ideally, the heating profiles should be free from rotational variation, in order to avoid the introduction of polarization dependence. Using the heating element geometries illustrated in FIGS. 3 and 4, it is generally not possible to create heating profiles that are completely rotationally symmetric. However, results have been achieved that were superior to those typically achieved using a $CO_2$ laser technique, in which the fiber is only heated from one side.

Figure 5:
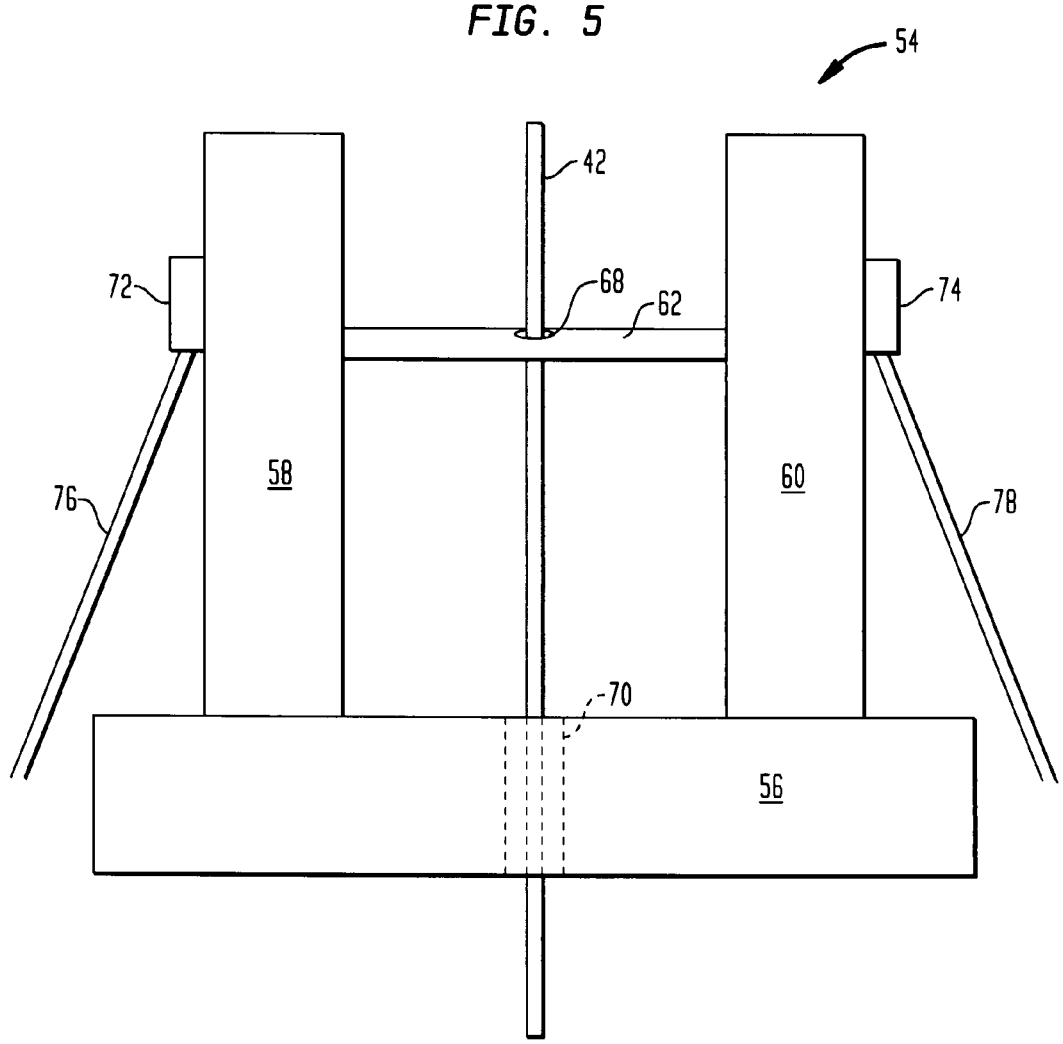
FIG. 5 shows a plan view of a resistive heater assembly suitable for use in the system shown in FIG. 2.

FIG. 5 shows a closeup view of the heating assembly 54 shown in FIG. 2. The heating assembly includes chassis 56 to which are mounting electrode blocks 58 and 60. A resistive heating element 62 is mounted between electrode blocks 58 and 60. In the FIG. 5 assembly 54, the resistive heating element 62 is provided by a wire made from platinum, or like material, such as the wire 620' shown in FIG. 4. The wire heating element 62 includes a hole 68 that is dimensioned to closely receive an optical fiber 42 threaded therethrough. Chassis 56 also includes a hole 70 that is aligned with hole 68 to allow the fiber 42 to be threaded through both holes 68 and 70 in a straight line. Electrode blocks 58 and 60 include respective connectors 72 and 74 for connecting to conductors 76 and 78, which are connected to a current source, such as current source 64, shown in FIG. 2.

There are now described two techniques for using the system 40 shown in FIG. 2 to fabricate a long-period grating (LPG) or the like: a "tension" technique, in which a controlled tension is applied to the fiber as it is heated by the described resistive heating element, and a "tensionless" technique, in which no tension is applied to the fiber as it is heated by the resistive heating element. Each technique is described in turn.

Tension Technique

An aspect of the invention provides a technique for forming a grating in a segment of optical fiber, according to which a controlled tension is applied to a heat-softened portion of the fiber to cause it to stretch, thereby creating a physically down-tapered portion with a modified mode field diameter. Depending upon the particular fiber design, the down-tapering may cause an increase or decrease in mode field diameter. The down-tapering is repeated to create a desired modulation of the fiber's refractive index profile along the length of the fiber segment.

Figure 6:
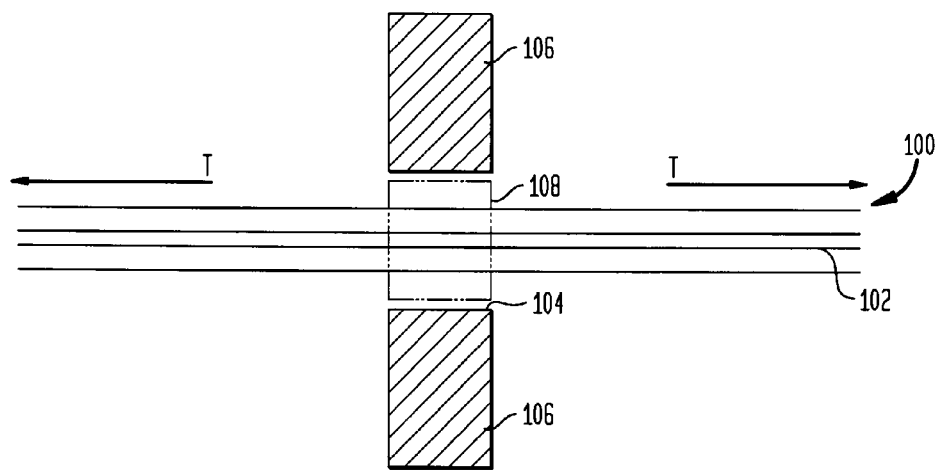
FIGS. 6-8 are a series of diagrams illustrating a tension technique, suitably performed using the system shown in FIG. 2, for writing a long-period grating, or the like, into an optical fiber segment.

FIG. 6 shows a cross section of a segment of optical fiber 100. The fiber segment 100 includes a central mode field 102, running down the length of the fiber segment, for propagating an optical signal. The fiber segment 100 is threaded through a hole 104 in a resistive heating element 106 in a heating system, such as the system shown in FIG. 2, discussed above. The resistive heating element generates a controlled, highly localized heating zone 108, that has a sufficiently high temperature, typically approximately 1,0000° C. or greater, to cause the fiber within the heating zone 108 to soften after a certain amount of time.

A predetermined amount of tension T is applied to the fiber. The amount of tension is chosen such that the applied tension will be sufficient to cause a suitable stretching and down-tapering of a heated portion of the fiber segment heated within the localized heating zone for a certain amount of time.

Another consideration in choosing the amount of tension is the prevention of fiber breakage.

Figure 7:
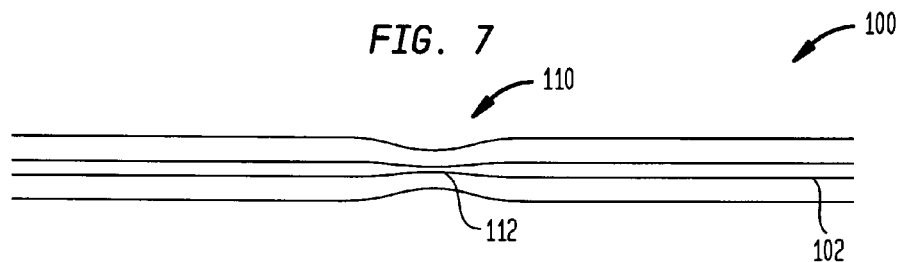

FIG. 7 shows a diagram, not drawn to scale, of the fiber segment 100 after a predetermined amount of heat and tension has been applied to a localized region. As shown in FIG. 7, the fiber segment now includes a physically down-tapered region 110, having a proportionately down-tapered mode field 112. The amount of down-tapering can be adjusted by adjusting some or all of the following parameters: the shape and size of the heating zone, the temperature of the heating zone, the length of time within the heating zone, the composition and diameter of the optical fiber, and the amount of applied tension.

Figure 8:
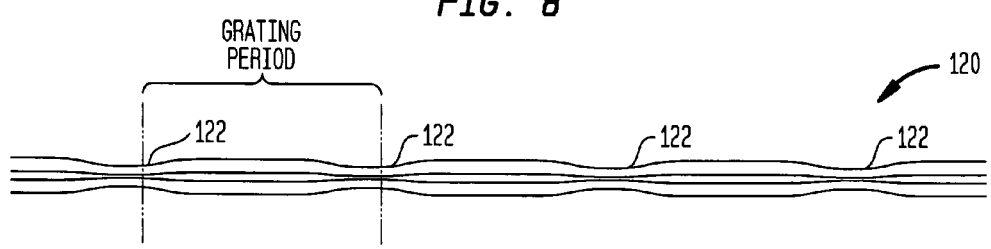

The fiber 100 is then advanced a short distance, corresponding to the desired grating period. The fiber is moved sufficiently rapidly such that down-tapering occurs only at the selected intervals. This process is repeated until the desired modulation pattern has been achieved. FIG. 8 shows a diagram, not drawn to scale, of a representative long-period fiber grating 120 fabricated according to the described tension technique. The grating 120 includes a plurality of evenly spaced down-tapered regions 122. The distance between adjacent down-tapered regions corresponds to the grating period.

Figure 9:
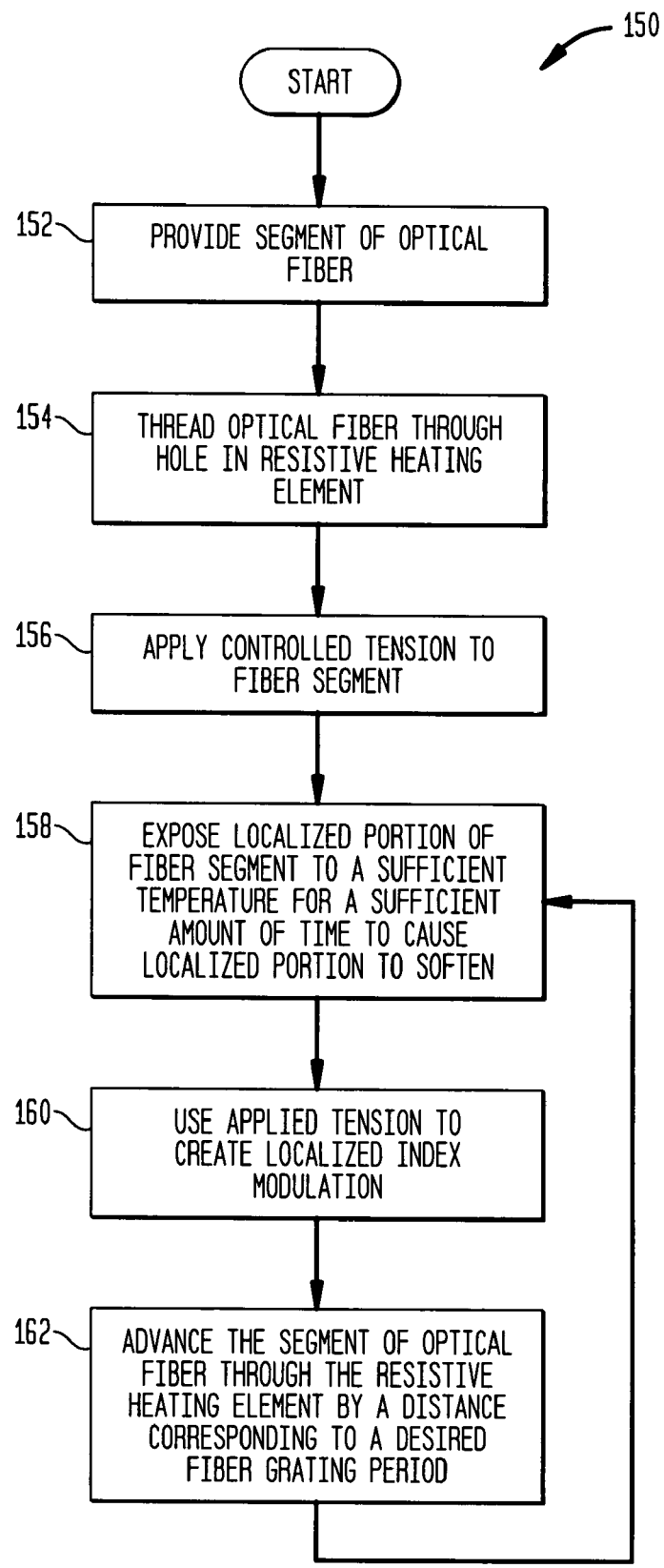
FIG. 9 shows a flowchart of the technique illustrated in FIGS. 6-8.

FIG. 9 shows a flowchart of a tension method 150, according to an aspect of the present invention for using a resistive heater to fabricate a long-period fiber grating. In step 152, a segment of optical fiber is provided. In step 154, the optical fiber is threaded through a hole in a resistive heating element in a resistive heater. In step 156, a controlled tension is applied to the fiber segment. In step 158, a localized portion of the fiber segment is exposed to a sufficient temperature for a sufficient amount of time to cause the localized portion to soften. In step 160, the softened fiber portion is allowed to stretch and down-taper as a result of the applied tension. In step 162, the fiber segment is advanced through the resistive heating element by a distance corresponding to a desired fiber grating period. Steps 158, 160 and 162 are repeated until a desired number of periodic modulations have been achieved.

According to a further aspect of the invention, an applied tension is used to cause a localized change in a fiber's refractive index profile by introducing stresses into the heated region. The introduced stresses are similar to the draw-induced stresses discussed below.

According to this aspect of the invention, a resistive heating element is used to cause a softening of a localized region of the optical fiber segment. A controlled tension is then applied to the fiber to cause stresses to form within the heated region. However, the total amount of applied heat and tension is this case is insufficient to cause a physical down-tapering of the heated region. The stressed region is then moved out of the localized heating zone, and the induced stresses are then "frozen" into the stressed region.

A suitable optical fiber may be custom-designed for this particular aspect of the invention.

Tensionless Technique

According to a further aspect of the invention, a desired modulation pattern is formed in an optical fiber segment by using the localized heat from a resistive heating element without an applied tension. This non-tension technique can be better understood by considering how the coupling strength $\kappa_g$ is related to the index change by the following integral over the fiber cross section A:

$$\kappa_g = \int_A E_{01} * E_{cl}{}'' * \Delta n(r) * dA \quad (3)$$

$E_{01}$ and $E_{cl}''$ are electrical mode fields involved, $\Delta n(r)$ is index modulation with respect to radius r. Thus, a fiber's refractive index profile can be tailored for an optimal coupling strength $\kappa_g$.

An optical fiber is formed by fabricating a solid preform having a number of concentric regions that, as a result of chemical dopants, have different refractive indices and viscosities. During the draw process, a certain amount of stress arising from viscoelastic strain, viscosity variations, and other factors, is introduced into the fiber, and is frozen into the fiber as it cools.

Draw-induced strains and stresses tend to decrease the density of a fiber region, thereby lowering its refractive index. Subsequently heating a portion of the fiber to its softening point, typically in the range of 1,000° C., will cause the frozen-in strain state to relax, thereby reversing the change in refractive index caused by the frozen-in strain. Thus, an optical fiber will typically have a "draw-induced" refractive-index profile that is different from its "relaxed" refractive index profile.

Through the selection of dopant levels and compositions, a fiber can be designed to have a desired "draw-induced" refractive index profile and a desired "relaxed" refractive index profile having coupling characteristics suitable for the formation of a grating in the fiber. Further, it is possible to tune $\Delta n(r)$ of the drawn fiber by adjusting the amount of tension applied to the fiber during the drawing process.

By using a resistive heating element in accordance with the present aspect of the invention, it is possible to cause a localized relaxation of the stresses in the fiber, thereby causing a localized change from its draw-induced refractive index profile to its relaxed refractive index profile.

Figure 10:
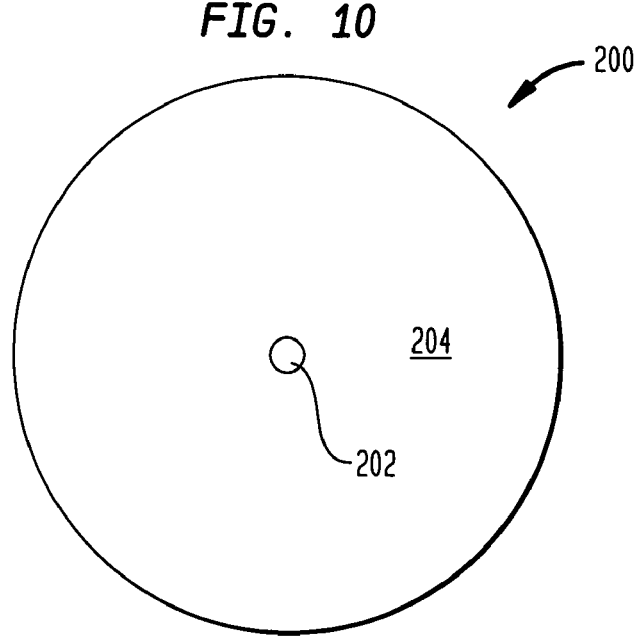
FIG. 10 shows a cross section view, not drawn to scale, of an optical fiber suitable for use in a tensionless technique for forming a long-period grating, or the like, in an optical fiber segment.
Figure 11A:
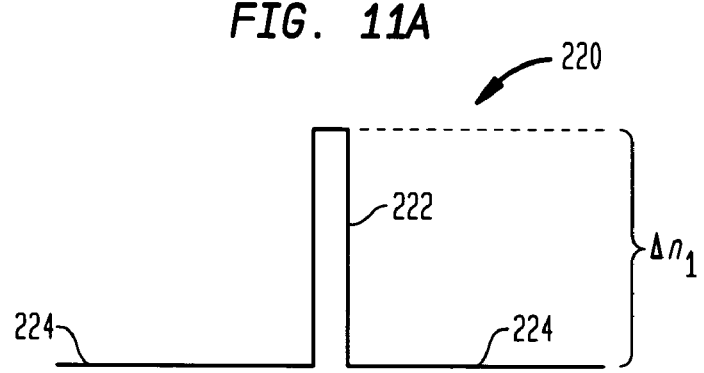
FIGS. 11A and 11B show draw-induced and relaxed refractive index profiles for the fiber shown in FIG. 10.
Figure 11B:
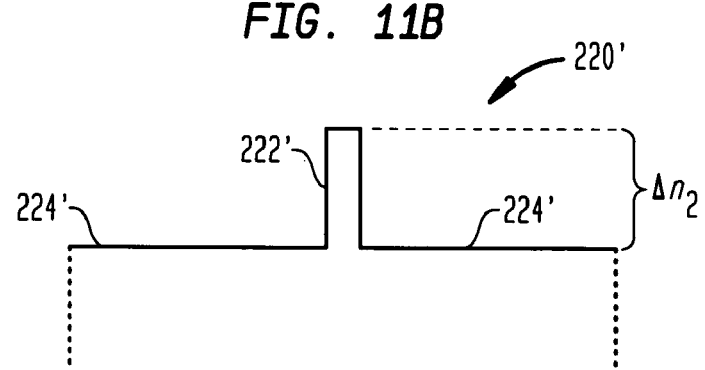

FIG. 10 shows a cross section diagram, not drawn to scale, of an exemplary optical fiber 200 having draw-induced and relaxed refractive index profiles suitable for the formation of a grating. The fiber 200 includes a core region 202 and a higher-viscosity cladding region 204.

Figure 1:
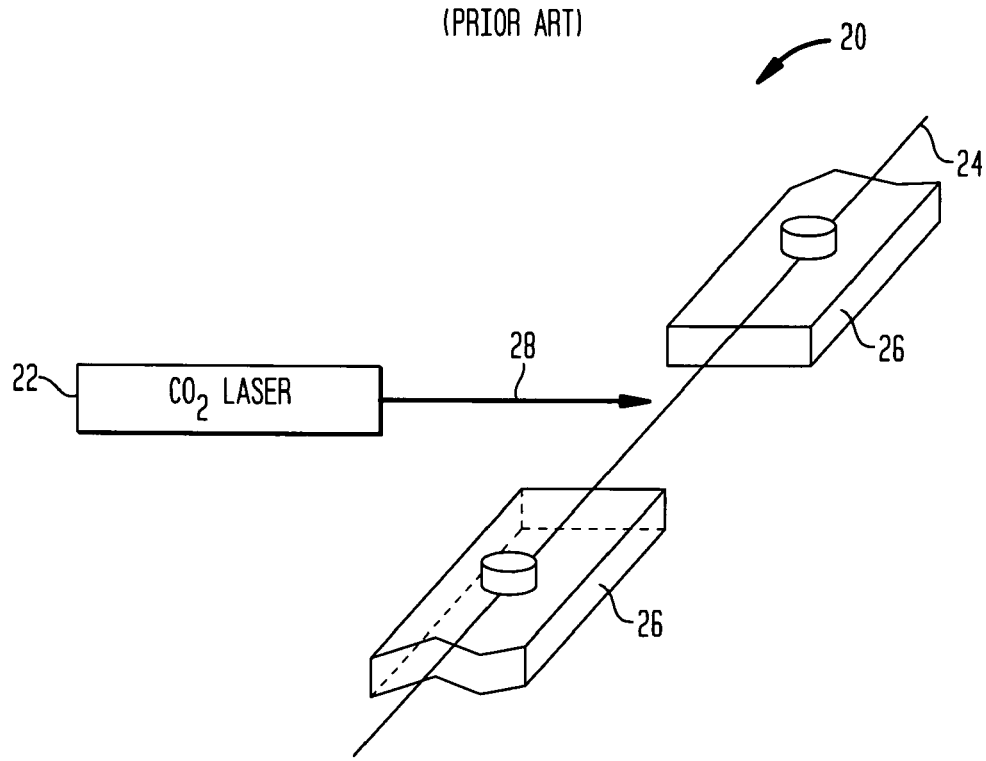
FIG. 1 shows a perspective view of a system, according to the prior art, for writing a long-period grating, or the like, into an optical fiber segment.

FIG. 1A shows a "draw-induced" refractive index profile 220 for the fiber 200. The refractive index of the core region 202 is represented by a central spike 222. The refractive index of the cladding region 204 is represented by "shoulders" 224 at the left and right sides of the central spike 222. The difference $\Delta n_1$ between the draw-induced core and cladding refractive indices may be tuned by adjusting the amount of applied tension during the fiber draw. FIG. 1B shows a refractive index profile 220' corresponding to the refractive indices of the fiber core 222' and cladding 224' in their relaxed state.

The exemplary fiber 200 has been doped such that the cladding region 204 has a significantly higher viscosity than the core region 202. Thus, most of the drawn-induced effects will be concentrated in the cladding region 204. Thus, it will be seen from the refractive index profiles 220 and 220' that the relaxed core index 222' is substantially equal to the draw-induced core index 222. The relaxed cladding refractive index 224', however, is significantly higher than the draw-induced cladding index 224. Thus, $\Delta n_2$ is significantly lower than $\Delta n_1$. It will be seen that the relaxation of the draw-induced effects in the exemplary fiber 200 causes a significant change in the fiber mode field.

Figure 12:
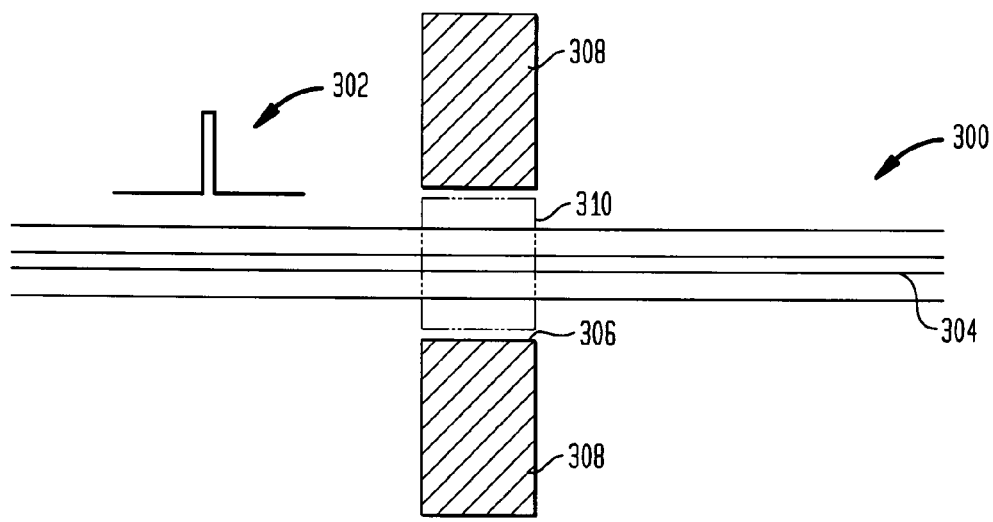
FIGS. 12-14 are a series of diagrams illustrating a tensionless technique, suitably performed using the system shown in FIG. 2, for writing a long-period grating, or the like, into an optical fiber segment.
Figure 13:
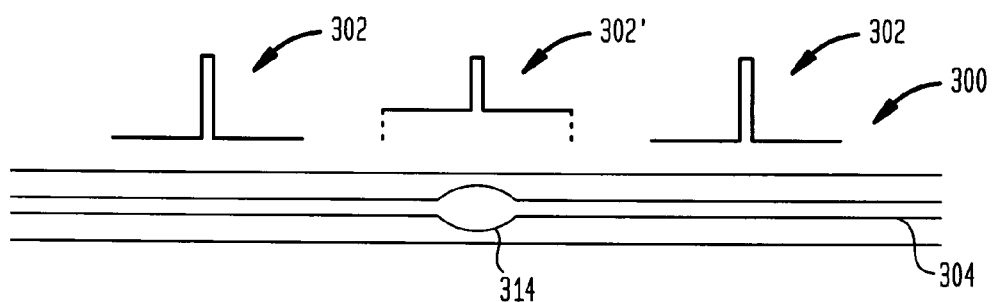
Figure 14:
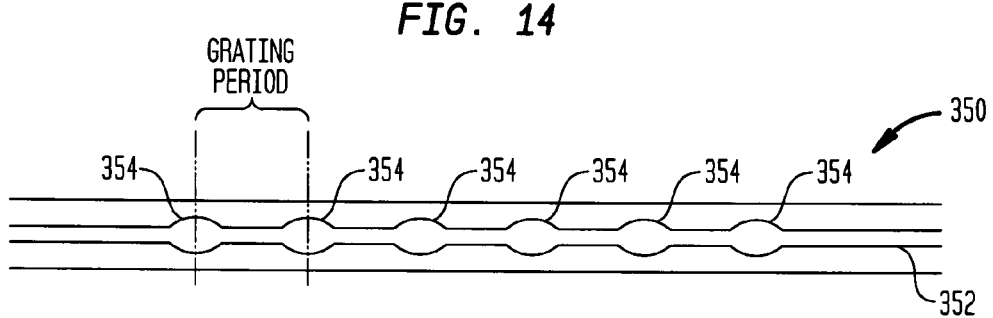

FIGS. 12-14 are a series of drawings illustrating a tensionless technique for using a resistive heater to form a long-period fiber grating, or the like, in a segment of optical fiber. FIG. 12 shows a cross section of a segment of optical fiber 300 having a strained refractive index 302 that forms a relatively narrow mode field 304. The optical fiber segment 300 is threaded through a hole 306 in a resistive heating element 308. The resistive heating element generates a controlled, highly localized heating zone 310, that has a sufficiently high temperature, typically approximately 1,000° C. or greater, to cause the fiber within the heating zone 310 to soften after a certain amount of time.

FIG. 13 shows a cross section diagram, not drawn to scale, of the fiber 300 after the application of heat using resistive heating element 308. The unheated portions of the fiber retain a draw-induced refractive index profile 302. The heated portion of the fiber now has a relaxed refractive index profile 302'. As shown in FIG. 13, the fiber modefield 302 now includes an expanded region 314, which corresponds to the local relaxation of the fiber's refractive index profile 302'.

FIG. 14 shows a cross section diagram, not drawn to scale, of a fiber grating 350 formed using the described tensionless method. The fiber grating 350 has a relatively narrow mode field 352, with a series of expanded portions 354 created by a relaxation of the frozen-in viscoelastic strain state. The distance between expanded portions 354 corresponds to the grating period.

Figure 15:
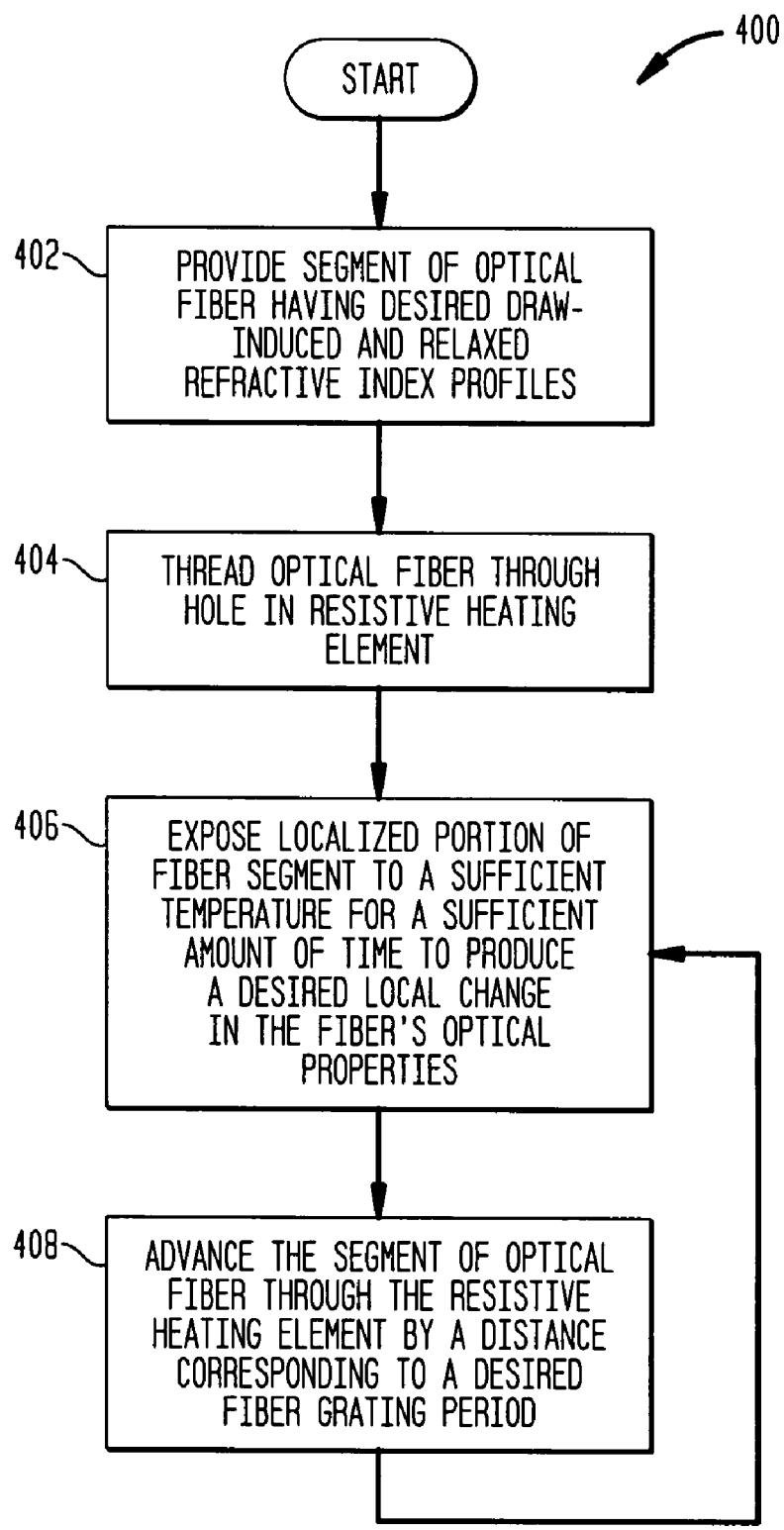
FIG. 15 shows a flowchart of the technique illustrated in FIGS. 12-14.

FIG. 15 shows a flowchart of a tensionless method 400, according to an aspect of the invention, for fabricating a long-period fiber grating. In step 402, a segment of optical fiber is provided having desired stressed/strained and relaxed refractive index profiles. In step 404, the fiber segment is threaded through a hole in a resistive heating element in a suitable resistive heater. In step 406, a localized portion of the fiber segment is exposed to a sufficient temperature for a sufficient amount of time to allow frozen-in viscoelastic strain state to be relaxed, thereby producing a desired local change in the fiber's optical properties. In step 408, the fiber segment is advanced through the resistive heating element by a distance corresponding to a desired fiber grating period. The fiber segment is moved quickly enough so as to prevent the heat from the heating element from affecting the portions of the fiber between the treated portions of the fiber. As discussed above, step 408 may suitably be executed through the use of a precision fiber translation assembly. Steps 406 and 408 are repeated until a desired number of periodic modulations have been achieved.

Figure 16:
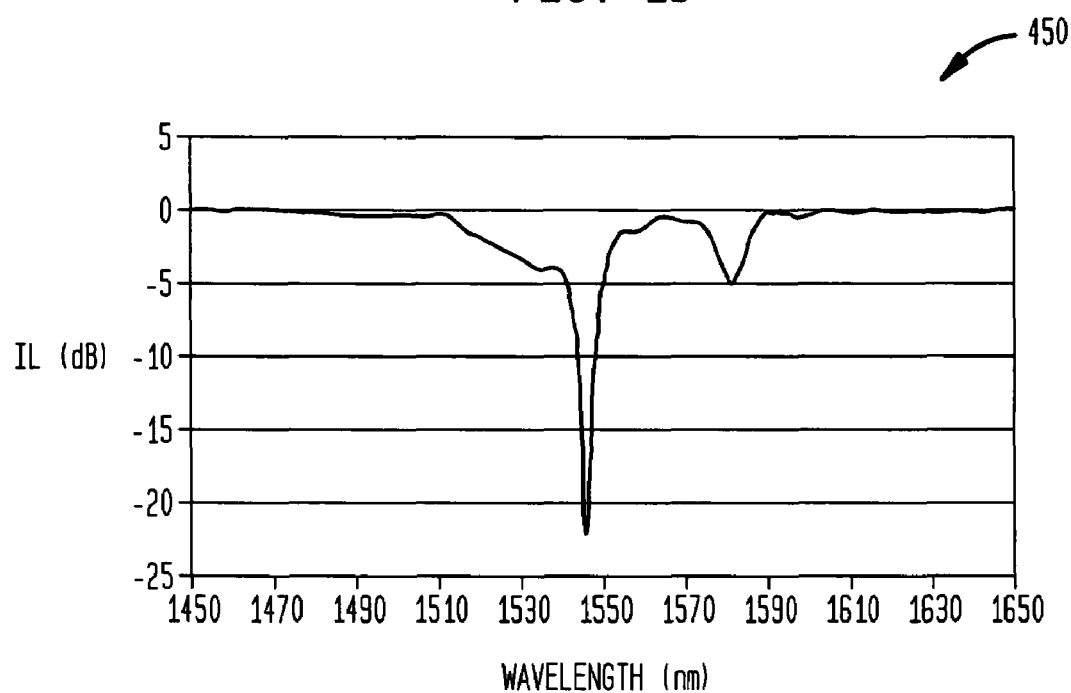
FIG. 16 shows a graph illustrating the amount of insertion loss when launching a fundamental mode into a long-period grating written into a segment of optical fiber in accordance with described aspects of the invention.

FIG. 16 shows a graph 450 illustrating the amount of insertion loss (IL) when launching the fundamental mode into an LPG written into a segment of optical fiber as described above. The fiber used was an OFS TrueWave Reduced Slope (TW-RS) fiber, having a diameter of 125 μm. The grating period was 665 μm. The heating system shown in FIG. 2, using a platinum wire as shown in FIG. 4 was used to form the grating. No tension was applied to the fiber. Therefore, weight 66 was unnecessary. The platinum wire had a diameter of 500 μm and a hole diameter of 190 μm. The platinum wire was about 15 mm long and placed in between two electrodes as shown in FIG. 2. The heating current was 18.8 amps. The fiber was heated for 5 seconds in the heating zone, before it was moved to the next period with a speed of 100 mm/sec.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. A method for writing a device into an optical fiber, comprising:
   (a) providing a segment of optical fiber;
   (b) providing a heating unit including a resistive heating element having a thickness that is smaller than a selected period for the optical device, the resistive heating element having a hole through its thickness, the hole being dimensioned to closely receive the fiber segment, the resistive heating element creating a localized, rotationally symmetric heating zone at the hole, the heating zone being shorter than the selected device period;
   (c) mounting the fiber segment into the heating unit with the fiber segment threaded through the hole in the resistive heating element;
   (d) positioning the fiber segment with respect to the resistive heating element such that a selected portion of the fiber segment is located within the heating zone;
   (e) raising the temperature of the resistive heating element to cause a change in the refractive index profile of the selected portion of the fiber segment.

2. The method of claim 1, further including:
   (f) repeating steps (d) and (e) for successive selected portions of the optical fiber segment, so as to write a grating into the optical fiber segment.

3. The method of claim 1, wherein step (c) further includes: applying a controlled tension to the fiber, the controlled tension and applied heat causing a physical down-tapering of the heated portion of the fiber, thereby causing a localized index modulation.

4. The method of claim 1, wherein step (c) further includes: applying a controlled tension to the fiber, the controlled tension and applied heat introducing stresses into the heated portion of the fiber, thereby causing a localized index modulation.

5. The method of claim 1, wherein step (c) further includes: causing a localized refractive index modulation in the fiber segment without the use of an applied tension.

6. The method of claim 1, further including: providing a fiber segment having a draw-induced refractive index profile and a relaxed index profile, the application of heat to the selected portion of the fiber segment causing a localized change from the draw-induced refractive index profile to the relaxed index profile.

7. The method of claim 6, further including: tuning Δn(r) of the first refractive index profile by adjusting the amount of tension applied when the fiber is drawn.

8. The method of claim 1, wherein step (c) further includes: providing a heating unit with a resistive heating element having a hole therethrough dimensioned to closely receive the optical fiber.

9. The method of claim 8, wherein in step (c) the provided heating element is a plate.

10. The method of claim 9, wherein the plate is fabricated from Kanthal.

11. The method of claim 8, wherein in step (c) the provided heating element is a wire.

12. The method of claim 11, wherein the wire is fabricated from platinum.

13. The method of claim 8, further including: dimensioning the resistive heating element to achieve an optimal heat profile and modulation shape along the length of the grating.

14. The method of claim 8, further including: reducing the diameter of the provided fiber segment so as to allow the geometry of the heating element to be minimized, thereby creating a more localized heating region.

15. The method of claim 5, wherein in step (a), the provided optical fiber has a refractive index profile that is optimized for index modulation using a resistive heating element.

16. The method of claim 13, further including tuning the value of the fiber's $\Delta n(r)$ by adjusting the amount of tension during the fiber draw.

17. A system for writing a device into an optical fiber, comprising:

a resistive heating assembly, including a chassis and a pair of electrode blocks mounted thereto, the resistive heating assembly further including a resistive heating element mounted between the electrode blocks, the resistive heating element having a thickness that is smaller than a selected period for the optical device, the resistive heating element having a hole through its thickness, the hole being dimensioned to closely receive an optical fiber segment, the resistive heating element creating a localized, substantially rotationally symmetric heating zone at the hole, the heating zone being shorter than the selected device period; and a fiber translation assembly, including a pair of translators for holding and advancing an optical fiber segment threaded through the hole in the resistive heating element, the movement of the translators being controlled by a controller.

18. The system of claim 17, wherein the resistive heating element is a plate.

19. The system of claim 17, wherein the resistive heating element is a wire.

* * * * *